US009285476B2

(12) United States Patent
van der Velden

(10) Patent No.: US 9,285,476 B2
(45) Date of Patent: Mar. 15, 2016

(54) SYSTEM FOR AUTOMATED DETECTION IN BEVERAGE DISPENSING MACHINES

(71) Applicant: Koninklijke Douwe Egberts B.V., Utrecht (NL)

(72) Inventor: Leonardus Cornelis van der Velden, Utrecht (NL)

(73) Assignee: Koninklijke Douwe Egberts B. V., Utrecht (NL)

( * ) Notice: Subject to any disclaimer, the term of this patent is extended or adjusted under 35 U.S.C. 154(b) by 0 days.

(21) Appl. No.: 14/581,149

(22) Filed: Dec. 23, 2014

(65) Prior Publication Data

US 2015/0136991 A1 May 21, 2015

Related U.S. Application Data

(63) Continuation of application No. PCT/NL2013/050477, filed on Jul. 1, 2013.

(30) Foreign Application Priority Data

Jun. 29, 2012 (NL) ...................................... 2009092

(51) Int. Cl.
*G01J 5/02* (2006.01)
*G01S 17/02* (2006.01)
*A47J 31/40* (2006.01)
*G01F 23/292* (2006.01)

(52) U.S. Cl.
CPC ............. *G01S 17/026* (2013.01); *A47J 31/404* (2013.01); *A47J 31/407* (2013.01); *G01F 23/292* (2013.01)

(58) Field of Classification Search
CPC .......... G01N 21/1909; G01P 3/36; G03D 3/06
See application file for complete search history.

(56) References Cited

U.S. PATENT DOCUMENTS 4,182,451 A * 1/1980 Watson .......................... 209/524
4,829,448 A * 5/1989 Balding et al. ................. 702/33
(Continued)

FOREIGN PATENT DOCUMENTS

| DE | 3240047 | 5/1984 |
|----|---------|--------|
| DE | 102008055949 | 12/2010 |
| EP | 0779156 | 6/1997 |

(Continued)

OTHER PUBLICATIONS

International Search Report and Written Opinion for PCT Application No. PCT/NL2013/050477, dated Apr. 30, 2014, 14 pages.
(Continued)

Primary Examiner — Kiho Kim
(74) Attorney, Agent, or Firm — Foley & Lardner LLP

(57) ABSTRACT

Means are provided for the support of the automated process of supplying beverages. More particularly, the detection of the presence and the contents of exchangeable supply packs in beverage dispensing machines is automated. A pack-in-place detection is provided by emitting light and measuring the presence of the emitted light on one light detector, the system determines the absence or the correct/incorrect placement of the supply pack. A product availability detection is provided by detecting the intensity of light coming through a transparent element in the supply pack by another light detector, the system identifies the degree of product presence in the supply pack.

25 Claims, 15 Drawing Sheets

(56) References Cited

U.S. PATENT DOCUMENTS 5,166,741 A * 11/1992 Gempe et al. .................. 356/28
2005/0022674 A1    2/2005 Campbell et al.

FOREIGN PATENT DOCUMENTS

| | | |
|---|---|---|
| EP | 1832210 | 9/2007 |
| WO | WO 2007/086744 | 8/2007 |
| WO | WO 2011/037464 | 3/2011 |
| WO | WO 2011/049446 | 4/2011 |
| WO | WO 2014/003570 | 1/2014 |

OTHER PUBLICATIONS

Description of "Auto broaching of supply containers or packs", published Apr. 12, 2011, retrieved from the internet at: http://pdfcast.org/pdf/auto-broaching on Dec. 22, 2014, 3 pages.

* cited by examiner

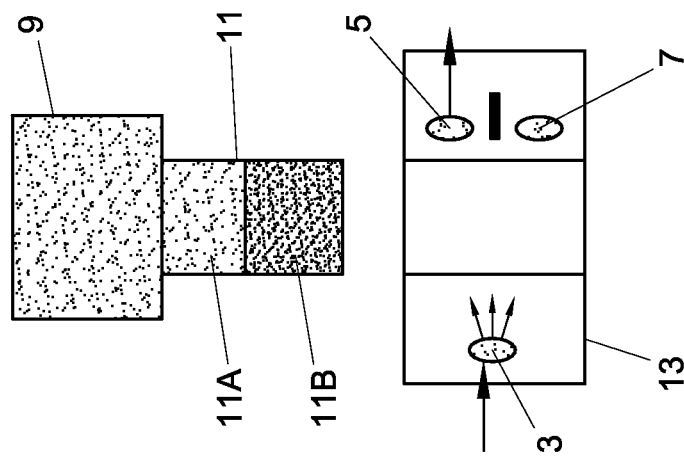
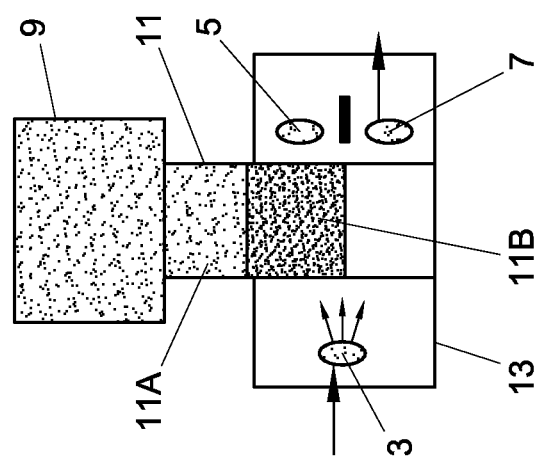
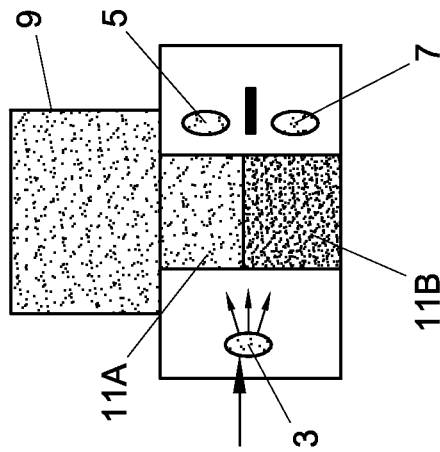

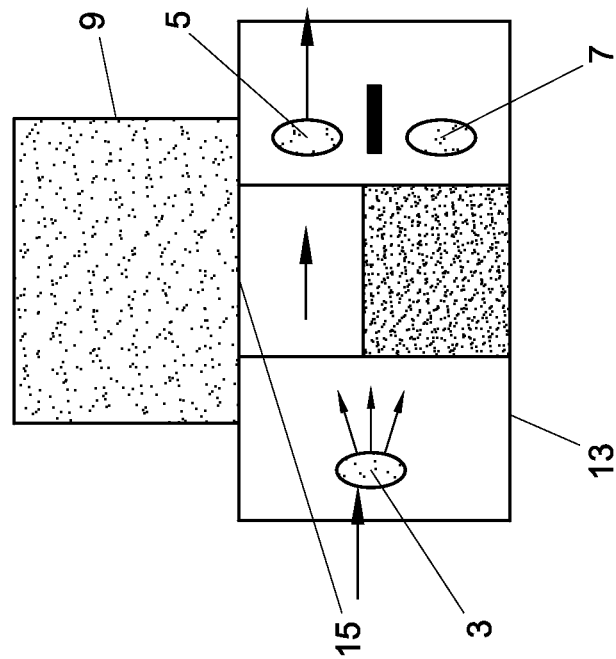
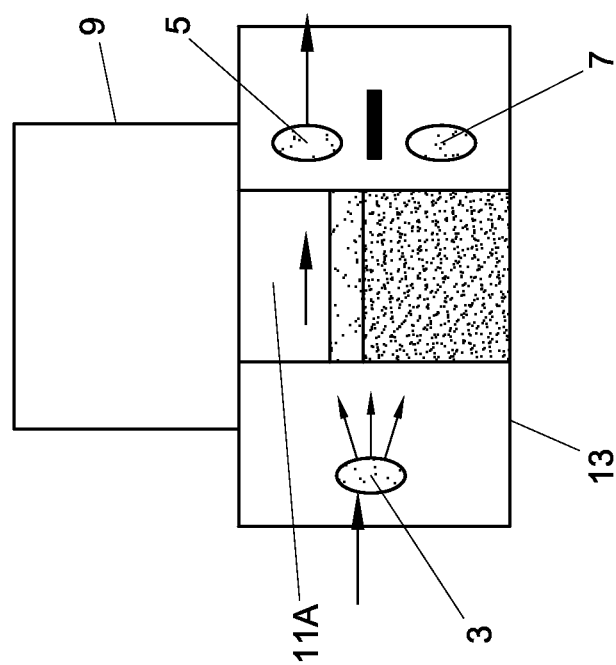

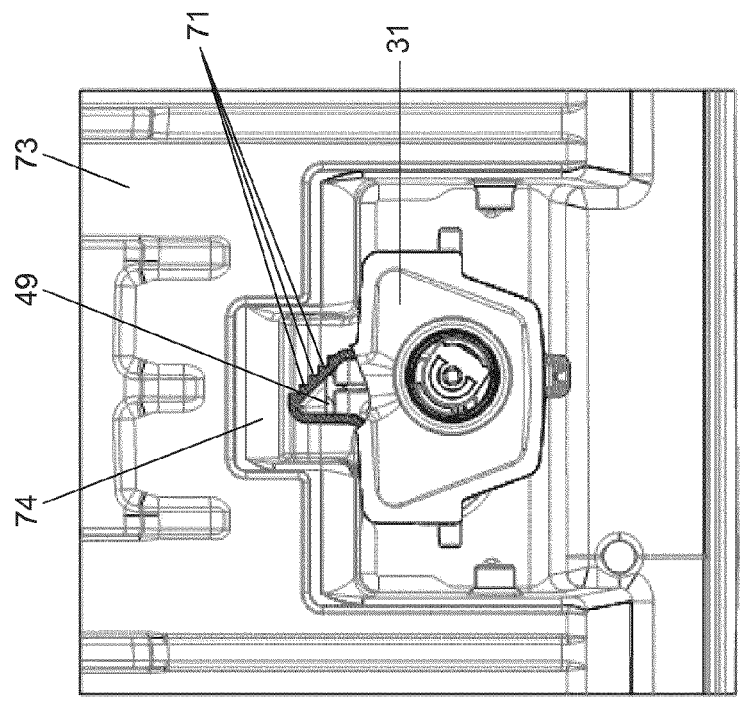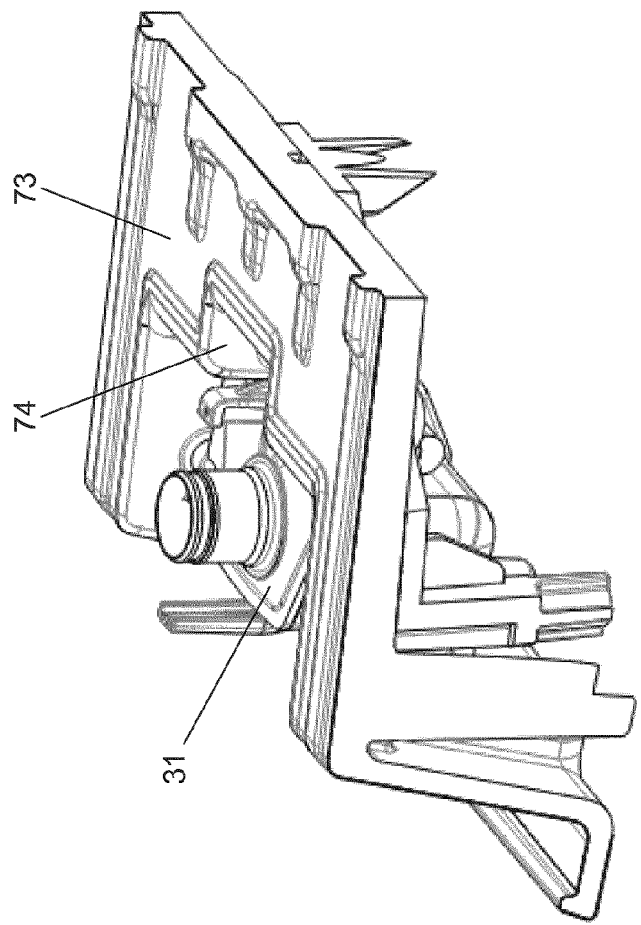
Fig. 16

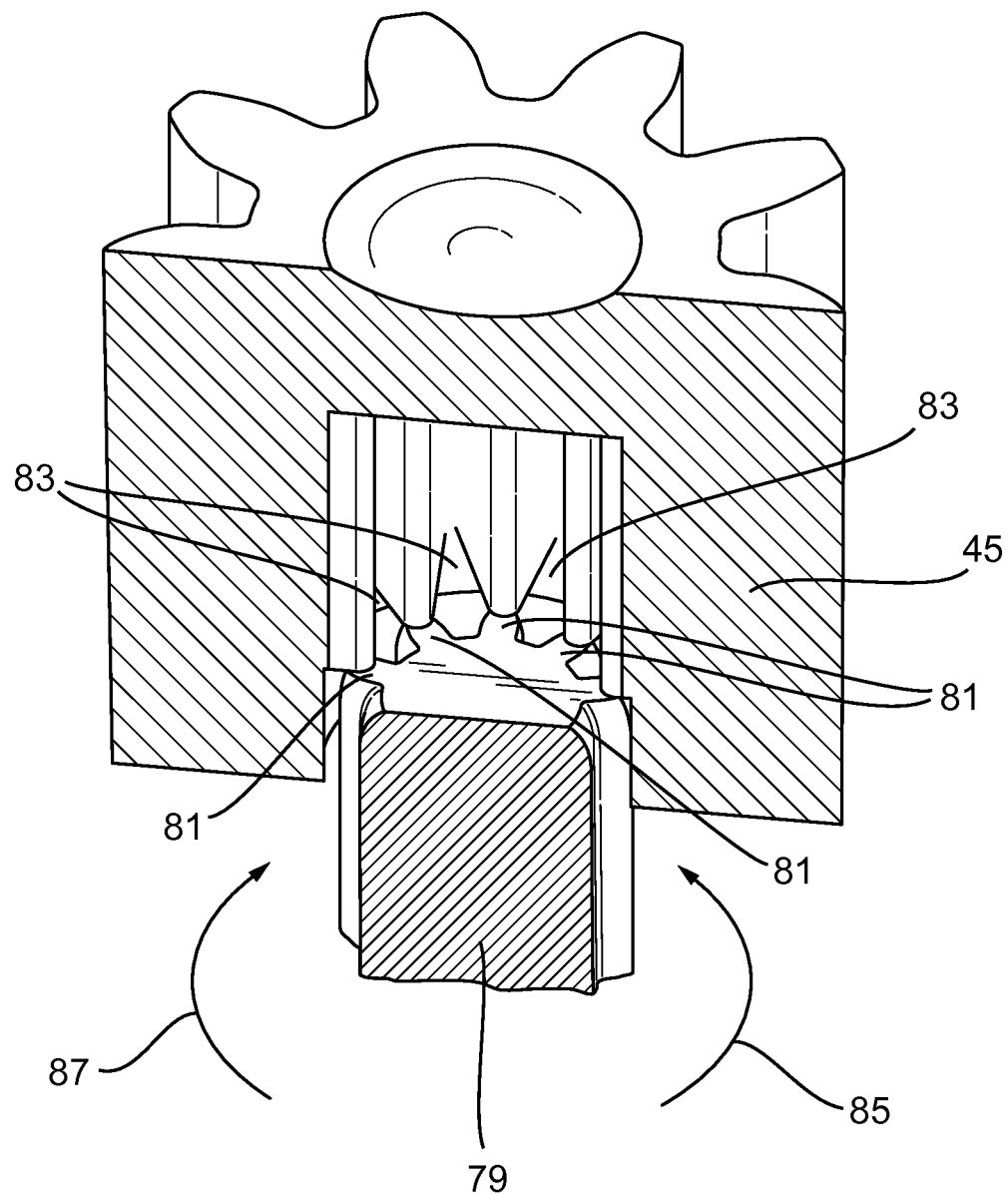

SYSTEM FOR AUTOMATED DETECTION IN BEVERAGE DISPENSING MACHINES

CROSS-REFERENCE TO RELATED APPLICATIONS

This application is a continuation of International Patent Application No. PCT/NL2013/050477, filed on Jul. 1, 2013, which claims the benefit of priority to Netherlands Application No. NL2009092, filed on Jun. 29, 2012, all of which are hereby incorporated herein by reference in their entireties.

BACKGROUND

The invention relates to a system comprising a beverage dispensing machine and an exchangeable supply pack comprising a doser which system comprises means for automated detection of the presence of the exchangeable supply pack and of the product in the exchangeable supply pack.

Service providers of beverages distribute their beverages mostly via automated dispensers in offices, public venues and other locations. Such beverage dispensing machines can include coffee machines for preparing hot beverages or post mix juice dispensing or vending machines for such products. Enhancing the ease of use when operating these beverage dispensing machines is crucial, not only for the consumer but also for the supplier. In the supply process, service providers are challenged to minimize human interference and maximize the degree of automation, for reasons of costs, efficiency and failure reduction. The present invention provides a robust, easy-to-use, failsafe and cost effective system for the support of the automated process of supplying beverages.

Pack and supply recognition in a beverage machine is disclosed in several documents such as DE 102008055949 and US 2005/022674. While each of the prior art supply detection means are reasonably effective, these all require a substantial effort as regards to sensors that need to be sensitive and accurate and the electronic systems involved. A drawback of such sensors and electronic systems is that these are relatively costly and require great attention to detail, not only in their being incorporated in appliances, but also regarding the product supply packs with which they have to be compatible.

SUMMARY

Accordingly it is an object of the present invention to propose an improved system for automatically performing supply detection, such as detection of pack positioning (pack-in-place) and product availability. In a more general sense it is an object of the invention to overcome or ameliorate at least one of the disadvantages of the prior art. It is also an object of the present invention to provide alternative systems which are less cumbersome in assembly and operation and which moreover can be made relatively inexpensively.

To this end the invention provides a system as defined in the appended claims. Such a supply detection means has the benefit of being relatively simple and reliable. The invention further provides for a reliable and possibly also failsafe distinction between individual signals generated by the first and second detectors, when a transmitter is used.

Detection and Recognition

The invention automates the detection of the presence and the contents of exchangeable supply packs in beverage dispensing machines. The invention may use light detection for the automated detection of pack positioning and product availability. An advantage of this system is that there is no physical contact between the first and second interface.

System

The invention provides a system comprising a beverage dispensing machine and exchangeable supply packs comprising a doser which packs are adapted to contain a product to be supplied in the operation of the system.

Means

The invention uses radiation such as light for the automated detection and recognition. More particularly, the invention may include several light sources and detectors in combination with transparent and opaque elements being part of the doser.

Pack-in-Place Detection

By emitting light and measuring the presence of the emitted light on a light detector, the system determines the absence or the correct/incorrect placement of the supply pack. More particularly, when the light does come through unhindered, the supply pack is absent or not properly placed.

Product Availability Detection

By detecting the intensity of light coming through transparent elements in the doser, the system identifies the degree of product presence in the supply pack.

Components for the Determination of Pack and Product Presence

The presented means for supply detection uses two light detectors. A transparent element of the doser is positioned between a transmitter and the first detector. An opaque element of the doser is positioned between a transmitter and the second detector. This measure provides for failsafe distinction between individual signals generated by the first and second detectors. Examples of transmitters include infrared (IR) light transmitters or light emitting diodes (LED).

The invention can be arranged to verify whether a signal generated by the first detector is below or above a predefined threshold. It can also be arranged that when the first detector detects radiation above the predefined threshold in combination with the second detector generating substantially no signal, a period of time lapsed after activation is considered to determine whether a positioned pack is empty or full, but still unopened.

This way a complete lack of signal or unexpected levels from at least one of the first and second detectors could be interpreted as a failure condition.

Splitting the detection into two sensors enables a cost effective, reliable and simple detection method as opposed to a single sensor that needs to be very accurate and is therefore expensive.

It has also been found that the end of product availability can be physically indicated by the presence of air in the liquid product as it is dispensed. The detection system uses the change in refractive index between a liquid and air to amplify the presence of air in the fluid as is passes into the pump. Therefore, it is advantageous that the transparent element of the doser is an optical element whereby it is only required that such an optical element can be utilised to alter a direction of light falling onto this optical element. The optical element can be in any shape or form that makes use of the difference in refractive index of fluid and air. The presence of a liquid in the transparent element of the doser causes the light from the transmitter to continue into the liquid and to be detected by the first detector. When air is present in the transparent element the direction of the light is altered. The deflected light is preferably detected by a third detector. Preferably, the first detector is then substantially aligned with the transmitter on a common axis and the third detector is then directed perpendicular to the common axis. More preferably, the optical element is a prism. Most preferably, the prism includes a plurality of prism facets (71). The third detector may be a reflection sensor The system uses exchangeable supply packs comprising fluid substances that are used in the preparation of a beverage for a user. The fluid substance may include but is not limited to coffee extracts, tea extracts, chocolate beverages, milk, flavours, juices, and/or concentrates thereof.

Examples of exchangeable supply packs are bag-in-box packs or rigid containers as disclosed in WO 2011/049446. An example of the doser is as disclosed in WO 2011/037464. The whole housing of the doser may be used as the second interface. Alternatively, only part of the doser includes the second interface.

In a further embodiment, the exchangeable supply pack may additionally be provided with a removable or pierceable seal, which separates the doser from the main body of the exchangeable supply pack that forms the actual fluid container. This seal covers the outlet opening of the actual fluid container, and is automatically broached by mechanical piercing or pushing out of the removable seal upon full engagement of the doser with the machine interface. This auto-broaching system is disclosed in an internet publication published on Apr. 12, 2011, http://pdfcast.org/pdf/auto-broaching.

In another embodiment, the doser and the exchangeable supply pack may be two separate elements whereby the doser may be connectable to the exchangeable supply pack.

The system of the present invention is described by the use of a supply detection arrangement for one exchangeable supply pack comprising a doser. However, a beverage dispensing machine may comprise more than one exchangeable supply pack. Accordingly, the system of the present invention may comprise one or more means for automatically detection depending on the number of exchangeable supply packs in the system.

The use of the expressions "substantially transparent" and "substantially opaque" should not be construed to limit the present invention. These expressions as used herein, are understood to refer to the respective possibilities of viewing through, allowing light to be transmitted there through, and effectively blocking all light. In its broadest sense these terms mean that the first element is able to let through more radiation than the second element. Another term for transparent can be translucent. Another term for opaque can be reflective.

BRIEF DESCRIPTION OF THE DRAWINGS

Detailed aspects and further advantages of the invention will be explained in reference to the accompanying drawings, in which:

FIG. 2 is a schematic view of a machine interface of the detection arrangement with an exchangeable supply pack comprising a doser not yet inserted;

FIG. 3 is a schematic view of the machine interface with an exchangeable supply pack comprising a doser that has not fully been inserted;

FIG. 4 is a schematic view of the machine interface with a fully and correctly inserted exchangeable supply pack comprising a doser;

FIG. 5 is a schematic view of an inserted exchangeable supply pack comprising a doser that is empty, or that has been emptied;

FIG. 6 is a schematic view of a further embodiment that has a removable seal in the exchangeable supply pack, which has not been opened;

FIG. 16 shows the doser without supply pack as inserted in its home position with respect to a part of a beverage dispensing appliance that carries the optical sensor arrangement;

FIG. 18 is a partial cross section of a gear pinion about to engage a drive shaft of the beverage appliance.

DETAILED DESCRIPTION

A preferred embodiment of the present invention uses double detection of a light beam, such as an Infra Red (IR) beam, radiated by a single transmitter, for detecting product positioning and product availability. It is expressively implied that transmitters and sensors in other frequency ranges of the spectrum can also be used.

Figure 1:
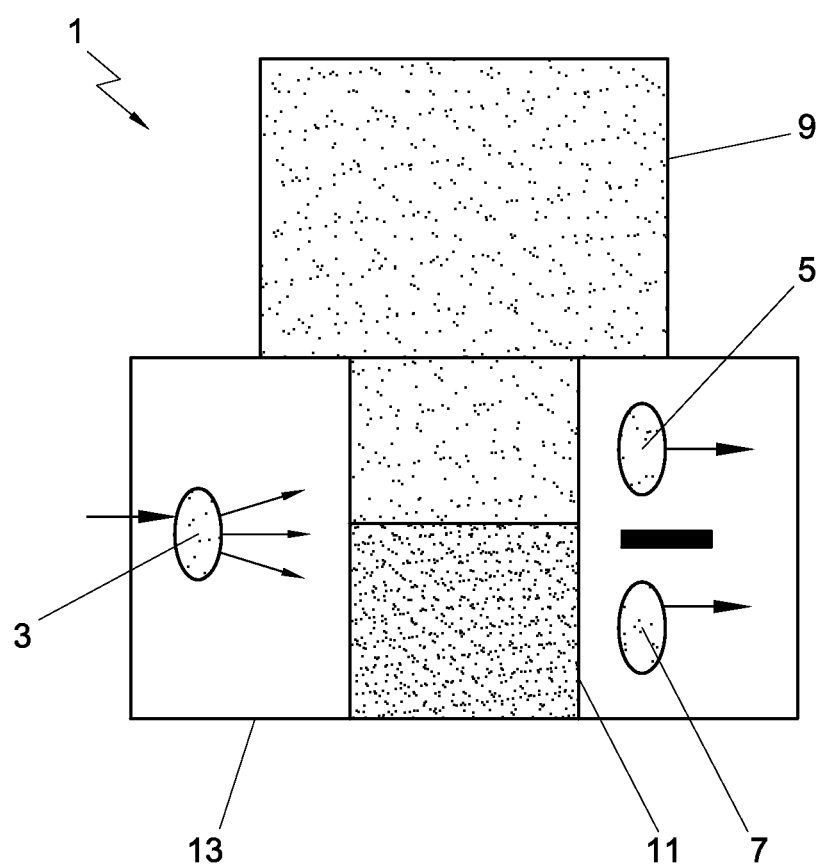
FIG. 1 is a schematic view of a supply detection arrangement according to the invention with a fully and correctly inserted exchangeable supply pack comprising a doser.

As shown in FIG. 1 a suitable means of detection can be an IR detection arrangement 1 with one single IR-transmitter 3 and first and second detectors 5, 7 instead of only one, as in conventional systems. The first detector 5 together with the IR-transmitter 3 for detecting product availability is proven technology and has been used before in detection systems. A second detector 7 is used to detect whether an exchangeable supply pack 9 comprising a doser 11 is in place. The detection arrangement 1 is part of a system that includes a beverage dispensing machine (not shown, but conventional) and at least one exchangeable supply pack comprising the doser 11. Such machines comprise at least one first or machine interface 13 for receiving at least one exchangeable supply pack 9 at at least one position. The doser 11 comprises a fluid connector and a dosing mechanism, such as a pump (not shown), and acts as a second or pack interface.

With the arrangement according to FIG. 1 detections are possible as discussed in reference to FIGS. 2 to 6. In FIG. 2 and subsequent FIGS. 3 to 6 arrows depicted at the transmitter 3 and the first and second detectors 5, 7 will schematically indicate activity of the transmitter or the respective detector.

In FIG. 2 a situation is depicted that a full exchangeable supply pack 9 comprising a doser 11 is not yet received between the transmitter 3 and the first and second detectors 5 and 7. Each of the first and second detectors is now exposed to the unobstructed radiation of the transmitter 3. This is characteristic for a situation that no pack is present. The doser 11 acts as a second or pack interface for cooperating with the first, or machine interface 13.

In FIG. 3 a full exchangeable supply pack 9 is shown whereby the doser 11 of the supply pack 9 is partly inserted between the transmitter 3 and the first detector 5. The doser 11 has an upper part 11A that is substantially transparent. The doser 11 further has a lower part 11B. The lower part 11B of the doser 11 is substantially opaque. When the first detector 5, as shown in FIG. 3, does not detect any radiation from the transmitter and when at the same time the second detector 7 detects the unobstructed radiation from the transmitter 3, then it can be determined that the pack 9 is not correctly inserted.

In FIG. 4 it is shown that the full pack 9 is properly inserted, with the upper part 11A facing the first detector 5 and the lower part 11B facing the second detector 7. In this case the pack 9 is full and thus filled with a liquid product. In this case the upper part 11A is filled with the liquid contents of the pack 9. Light emitted from the transmitter 3 is detected by the first detector 5 through the substantially transparent upper part 11A and the translucency of the liquid. This results in a signal generated by the first detector that is below a threshold typical for liquid detection (product availability). The second detector 7 receives no radiation from the transmitter 3, due to the opacity of the lower part 11B of the doser 11. This can be interpreted as a properly inserted full pack.

In FIG. 5 the same situation as in FIG. 4 is shown, except that here the pack 9 has reached an empty state. Here the partly translucent liquid product has sank below the level of the first detector 5, which now receives radiation from the transmitter 3 that is only obstructed by the transparent outer wall of the upper part 11A. This results in a different signal being generated by the first detector 5 that is above a predefined threshold, typical for an empty upper part 11A.

In a variation shown in FIG. 6, the pack 9 is additionally provided with a removable or pierceable seal 15, which separates the upper part 11A from the main body of the pack 9 that forms the actual fluid container. This seal 15 covers the outlet opening of the actual fluid container, and is automatically broached by mechanical piercing or pushing out of the removable seal 15 upon full engagement of the doser 11 with the machine interface 13. As shown in FIG. 6, the removal of the seal 15 has not been properly performed and no liquid has consequently entered the upper part 11A. This results in a combined reading of the first and second detectors 5 and 7 that differs from that in the situation of FIG. 4 and hence an unsuccessful broaching of the pack 9 can be detected. Basically the combined reading of the first and second detectors 5 and 7 is the same as in the situation of an emptied pack (FIG. 5), but the non-broached diagnosis can be related to the directly preceding pack insertion action having resulted in various changes of the detector readings.

The available detector readings are assembled in Table 1.

TABLE 1

| First detector (5) | Second detector (7) | Pack (9) |
|---|---|---|
| Below threshold | Below threshold | Present and full |
| Below threshold | Above threshold | Misplaced or in process of placement/removal |
| Above threshold | Below threshold | Empty or not broached |
| Above threshold | Above threshold | No pack present |

As shown in Table 1, double-conditions exist. To distinguish between these conditions it is also possible to make use of interaction with a door or hatch of a pack compartment of the machine. It is thus possible with such a door being closed or with the machine in start-up when this detector reading occurs to give the 'not broached' condition a higher priority. It is also possible to activate the machine to retry broaching of the pack seal, even when it was already broached at an earlier stage. When after, for example, two seconds no fluid enters the dosing room of the upper part 11A, a valid conclusion is generated that the pack 9 is empty.

Alternatively the non-broached and empty-pack diagnosis can also be related to a period of time that has lapsed after the appliance was last switched on.

Figure 7:
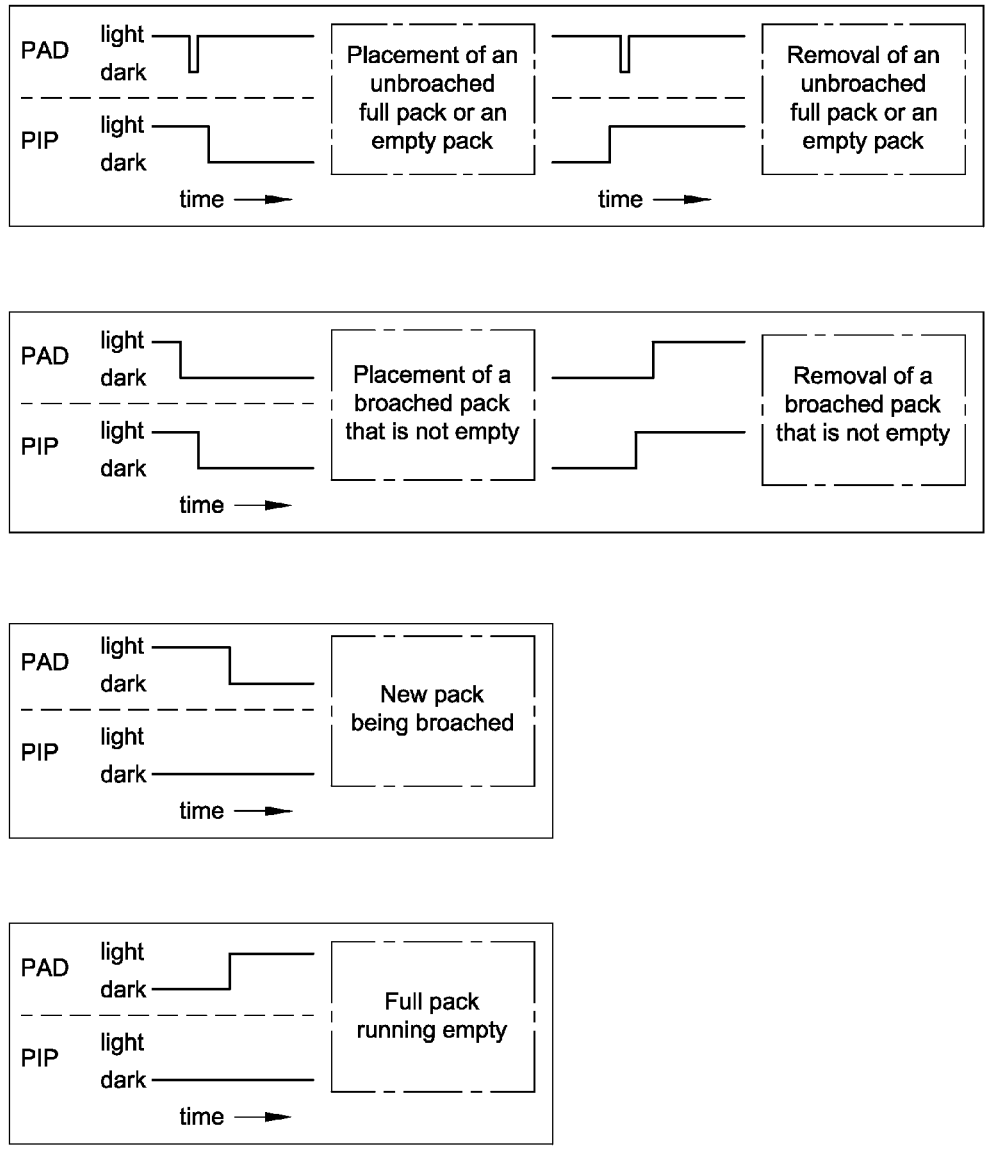
FIG. 7 shows schematic detector readings over time for pack-in-place detection (PIP) and product availability detection (PAD)

By plotting the signals of the first and second detectors 5 and 7 over time it can be determined whether a pack is being placed or removed. This is shown in FIG. 7 wherein schematic detector readings over time are shown for pack-in-place detection (PIP) and product-availability-detection (PAD) and the resulting diagnosis.

An additional requirement is to perform the above explained product availability and/or pack-in-place detection for misplaced packs in a failsafe manner. In order to make the detection fail safe the valid detection range lies between 0% and 100%, which are typical failure modes of these type of detectors. A suitable testing routine can be provided by disconnection of the sensors or transmitter. To create a failsafe path in this, it is further proposed that the doser does not block light 100% for pack presence detection but by way of example only 70%. When 100% blocking is detected then likely something else has occurred, like a detector or transmitter having become defective. Examples are given in Table 2, which also includes the typical failure modes of the detectors.

TABLE 2

| Transmitter (3) | first detector (5) | second detector (7) | Pack (9) |
|---|---|---|---|
| OK | <80% | 30% | Present and full |
| OK | 30% | >90% | Misplaced |
| OK | >80% | 30% | Empty or not broached |
| OK | >90% | >90% | No pack placed |
| OK | Defect 0% | >90% | Misplaced |
| OK | Defect 100% | >90% | No pack placed |
| OK | — | Defect 0% | Second detector (7) Abnormal low –> error |
| OK | — | Defect 100% | Misplaced |
| Defect | 0% | 0% | Second detector pack Abnormal low –> error |

It is apparent that when in fail mode a transmitter is not transmitting any light anymore or a sensor is detecting no light anymore this is detectable in system when the light damping of dosing pack-presence part is by way of example 60 to 70% rather than 100%.

Figure 8:
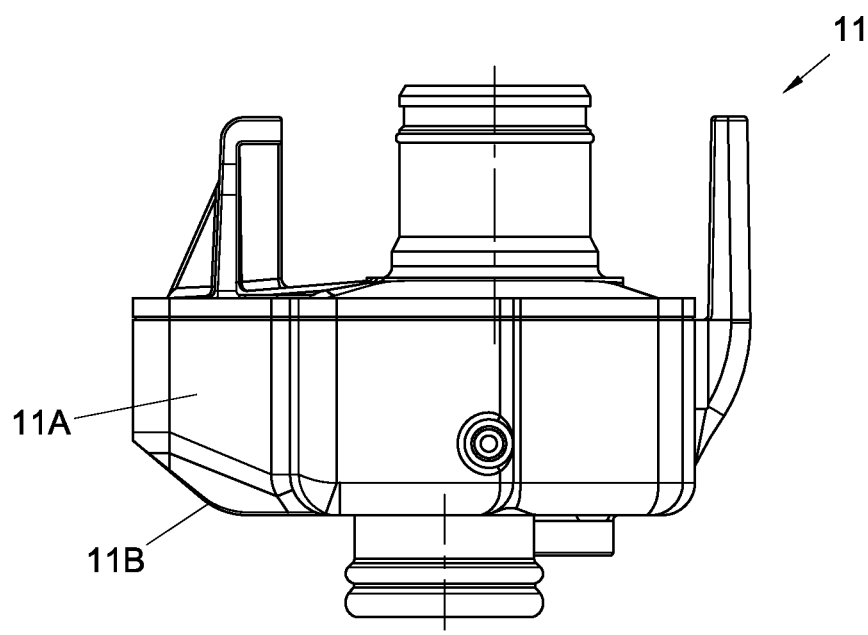
FIG. 8 shows a side view of an alternative embodiment of the present invention.
Figure 9:
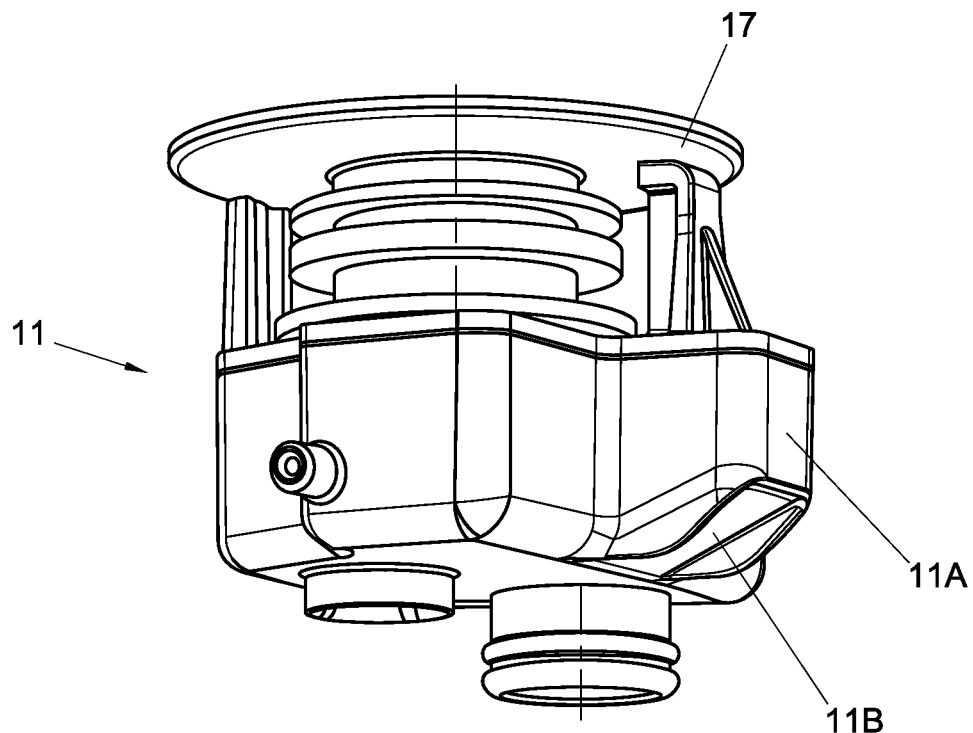
FIG. 9 is the perspective view of the embodiment of FIG. 8.
Figure 10:
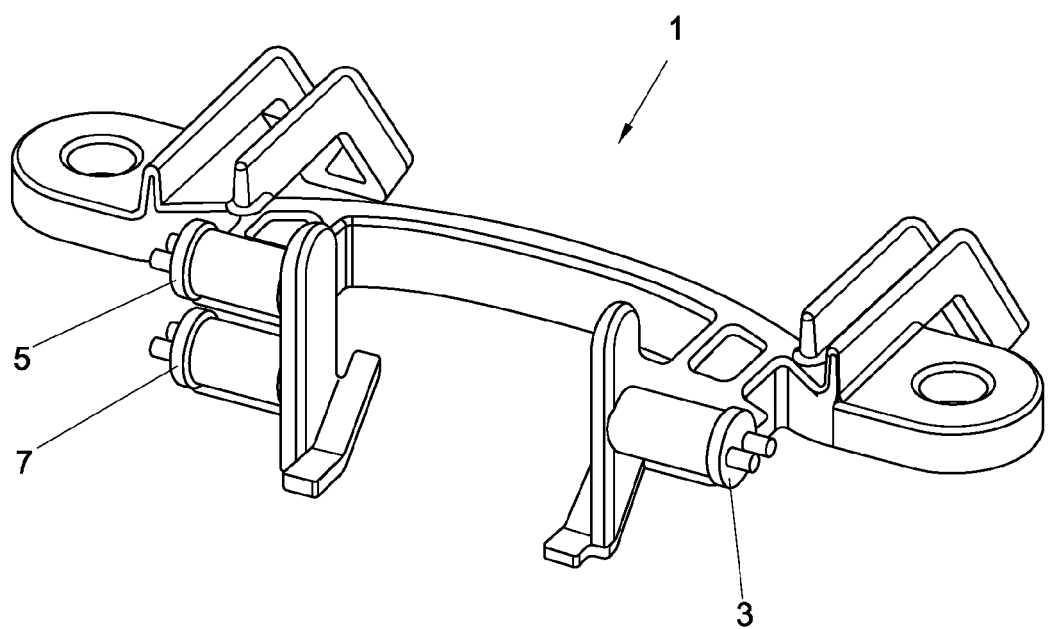
FIG. 10 is a supply detection arrangement according to the invention.

FIGS. 8 and 9 show an alternative embodiment in side and in perspective view. This embodiment is a doser according to the principles as disclosed in WO 2011/037464. The two required elements are positioned besides the in and outlet of the doser that comprises a fluid connector and a dosing mechanism, such as a pump (not shown). The doser 11 has an upper part 11A that is substantially transparent, and that is filled with the liquid contents of the pack 9 (not shown). The doser 11 further has a lower part 11B. The lower part 11B of the doser 11 is substantially opaque. FIG. 9 shows the spout 17 for connecting the doser 11 to the exchangeable supply pack. FIG. 10 shows a supply detection arrangement 1 according to the invention wherein the doser according to FIGS. 8 and 9 fits. It clearly shows the transmitter 3 and the first and second detectors 5, 7.

Figure 11:
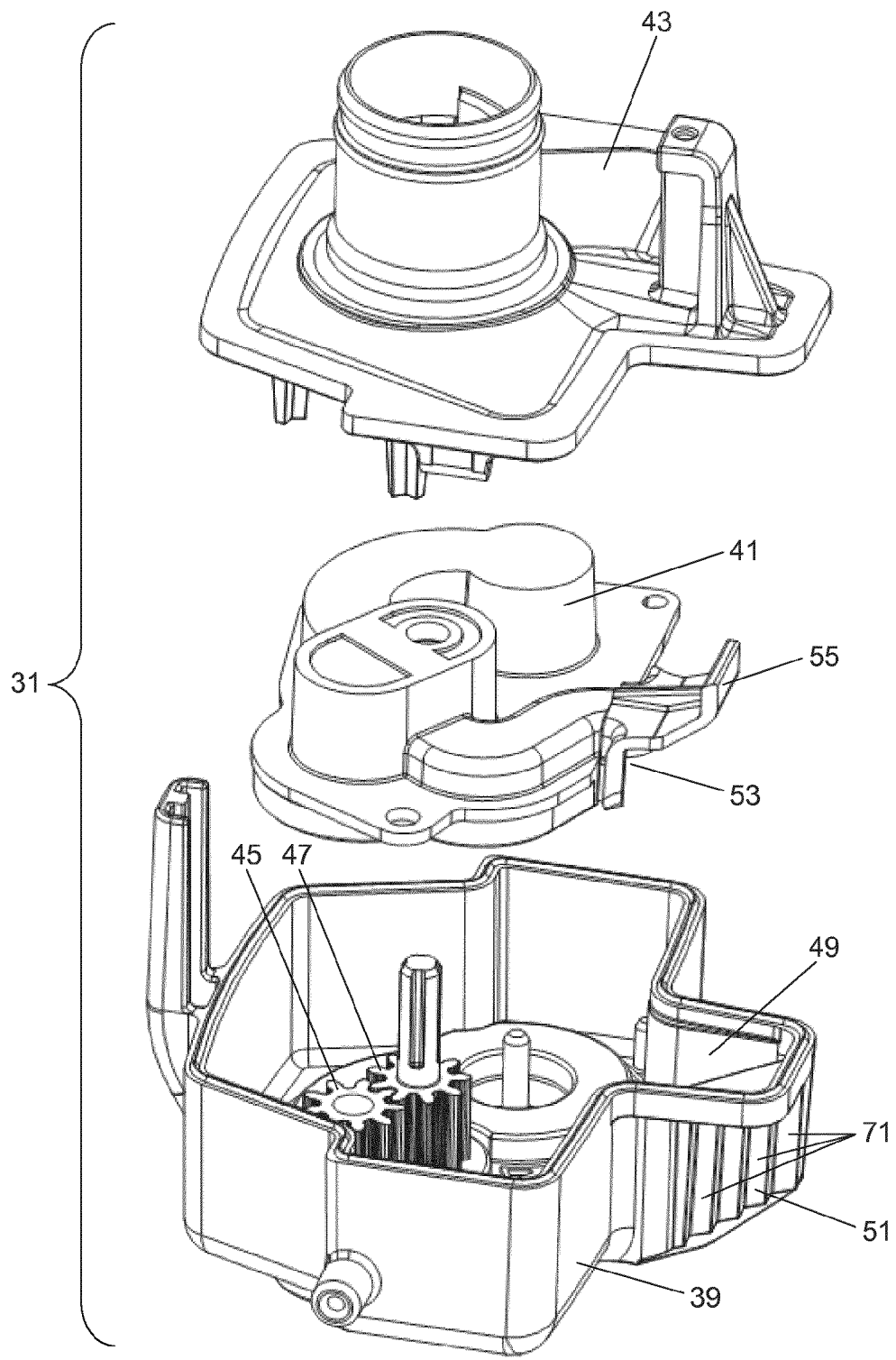
FIG. 11 is an exploded view showing the primary components of an alternative form of a doser for a system according to the invention.

An alternative doser 31 is shown in FIG. 11. A first substantially transparent element 49 can be seen protruding from the right hand side of the doser 31. A stepped/serrated feature 51 provides the optical element of the system, as will be explained below. The doser further includes a bottom housing 39, a pump housing 41, and a top cap 43. The bottom housing 39 is the main housing of the doser 31 A pump accommodated in the pump housing 41 is a gear pump with a pair of mutually engaging gear pinions 45, 47. One of the gear pinions 45, 47 of the pair is arranged for coupling to a drive shaft of a beverage dispensing machine.

The pump housing 41 provides the body of the gear pump and both an inlet and outlet orifices for the pump. In the specific embodiment, as described here an extension 55 in the fluid flow path 53 can be seen on the right hand side of the pump housing 41. This extension 55 functions as a flow diverter. This flow diverter 55 ensures that product drawn into the pump passes through the first substantially transparent element, in the present figure sample chamber 49, and hence through the field of view of an optical system to be described below. It should be understood however that the flow diverter is an optional element not essential to the operation of the optical system.

The top cap 43 mounts to the bottom housing 39. The top cap 43 is used for attachment of the doser 31 to an exchangeable supply pack (not shown, but conventional).

Figure 12:
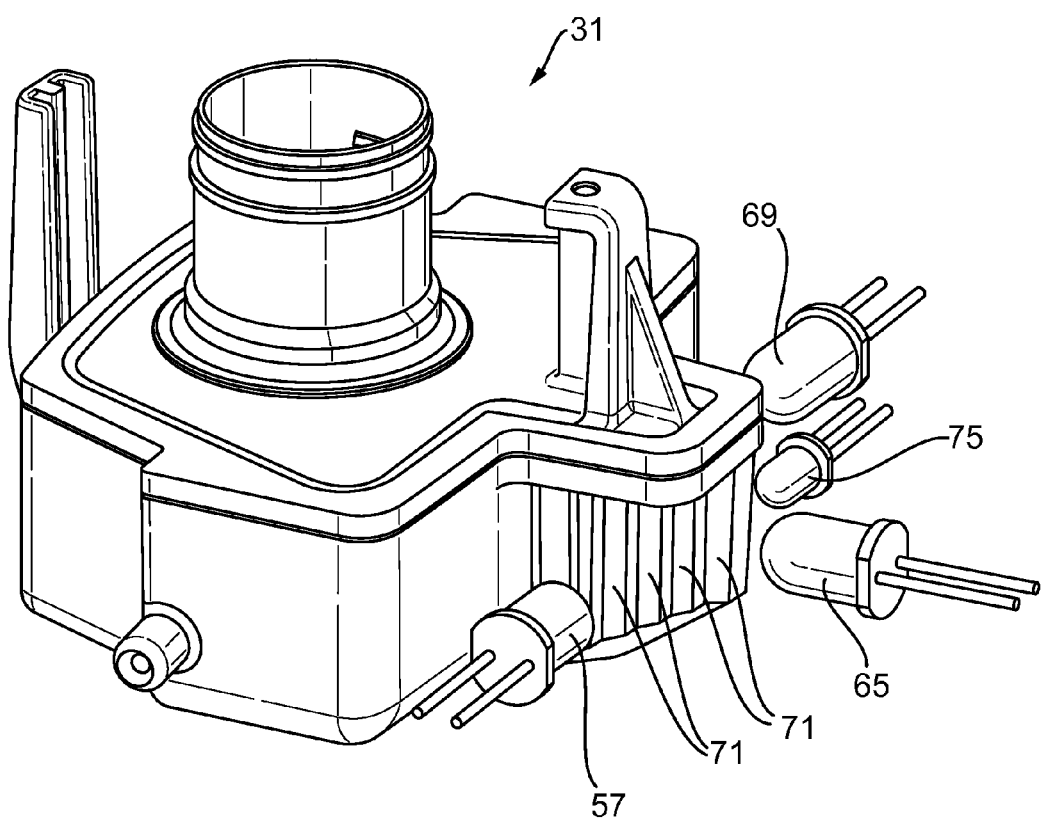
FIG. 12 shows the assembled doser of FIG. 11 with an optical detection arrangement that is part of a beverage dispensing appliance.
Figure 13A:
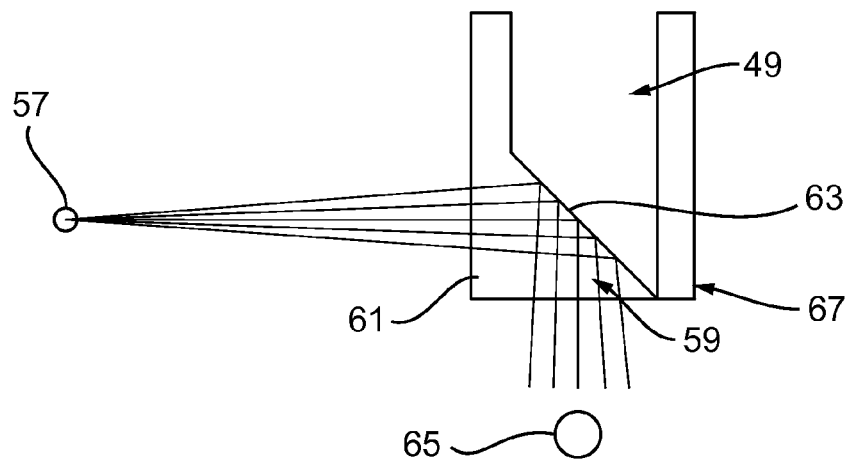
FIG. 13 is a schematic representation of a prism operation with air (A), with water (B), and a detailed view of a stepped prism design (C)
Figure 13B:
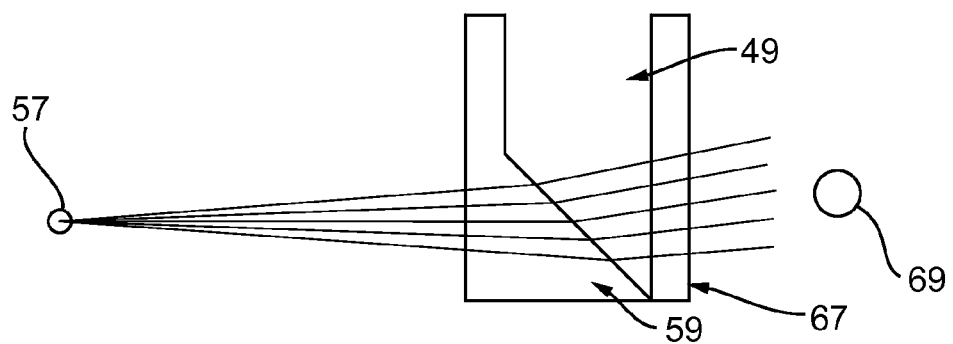

FIG. 12 shows the doser 31 of FIG. 11 in assembled condition and in position with respect to a detection arrangement. The end of product availability (liquid presence), in the alternative embodiment of doser 31, is physically indicated by the presence of air in the liquid product as it is dispensed. The detection system uses the change in refractive index between a liquid and air to amplify the presence of air in the fluid as is passes into the pump. An example of this optical effect is schematically shown in FIG. 13.

Light from an external light source 57 is directed towards a prism 59 that forms a part of the sample chamber 49. Here the prism 59 acts as an optical element, which can be an element in any shape or form that makes use of difference in refractive index of fluids and air. It is only required that such an optical element can be utilised to alter a direction of light falling onto this optical element. The light from the light source 57 passes through an external wall 61, but is reflected from an internal inside wall 63 when air is in the sample chamber 49 (see FIG. 13A). The reflected light then exits the prism 59 where it is detected by a third detector, e.g. a reflection sensor 65.

The presence of a liquid in the sample chamber 49 (see FIG. 13B) changes the refractive index at the internal inside wall 63 causing the light to continue into the liquid instead of being reflected. Light emerging from a far chamber wall 67 is detected by a first detector, e.g. transmission sensor 69.

Figure 13C:
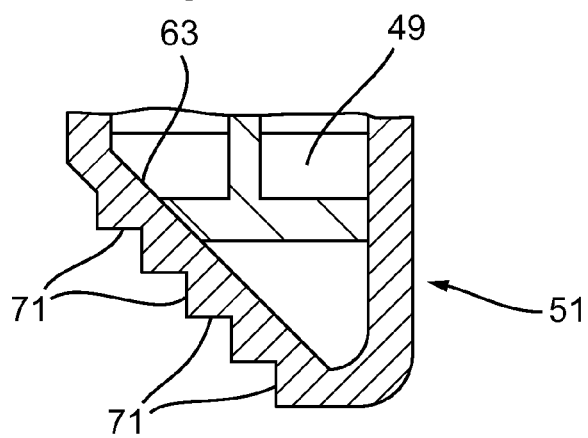

To reduce cost and improve manufacturability the solid prism 59 of the schematic FIG. 13 (A and B) is replaced by a series of smaller plurality of prism facets 71 shown in FIG. 13C. In the embodiment described the prism facets 71 form the stepped serrated feature 51 at an exterior of the inside wall 63 of the sample chamber 49. In other conceivable examples the whole housing of the doser might be used as the sample chamber and the prism facets could be incorporated into the housing side wall.

The prism facets 71 act to amplify the presence of air in the sample chamber by switching light towards the reflection sensor 65 when air is present on the inside wall 63. A further method of improving detection is the monitoring of the various sensors during a pumping cycle. Usually such internal reflection sensors 65 could be used as static device in that the presence of air is only tested before or after the dispense cycle.

The viscous and non-homogeneous nature of some liquids, especially liquid coffees, makes such an approach problematic. By monitoring the reflection and transmission sensors 65, 69 while the pump is operating it is possible to detect air bubbles entrained in the liquid. By careful design of the doser 31 it is possible to ensure that the entrained bubbles pass through the sensors' field of view. A further design consideration is to ensure that the bubbles are forced into contact with the internal wall 63 of each of the prism facets 71. This both improves detection and acts to clean the internal surfaces of product build up.

In the schematic example described above, in reference to FIG. 13 (A and B), a solid triangular prism 59 is used as the optical element in the system. The angle of the internal wall 63 is chosen as a function of the differing refractive index of air and the liquid to be measured. The angle is determined by optical analysis. Under ideal conditions with air in the sample chamber 49, all light is reflected to the reflection sensor 65 placed at 90 degrees to the incident light. Testing with various moulding techniques has shown that the optical performance is relatively unaffected by the slumping of surface features. The detection technique could therefore also use a solid prism. FIG. 13C shows the stepped prism design, using the plurality facets 71. In practice it is preferred that a low volume of plastic be used. The solid prism 59 has been implemented using a series of smaller triangular facets 71. These facets 71 form a step feature 51 as shown in FIG. 13C. Again the angle of the internal face or wall 63 is optimized through analysis. The size of the steps is a function of the light transmitting source 57 output angle and the reflection sensor 65 input angle. The facet steps 71 are typically at 90 degrees (but can be optimized if required). The surface finish should be flat and smooth to prevent surface scattering/lensing. Analysis has shown that a certain draft on either or both surfaces does not have a significant impact on its performance. The design is reasonably tolerant of variations due to manufacturing tolerances.

Figure 15:
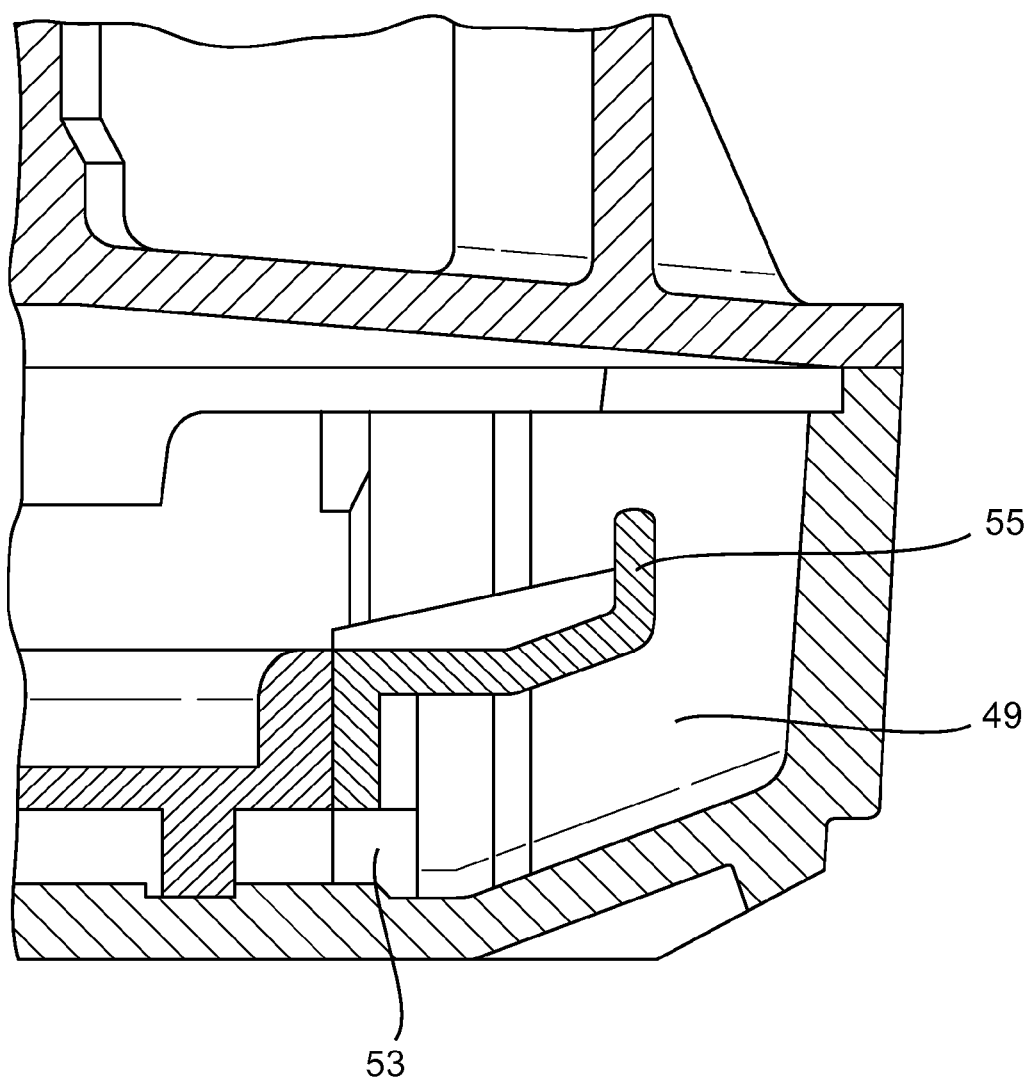
FIG. 15 is a detail cross section view, on an enlarged scale, of a flow diverter.

In the present embodiment the flow diverter 55 is optionally employed to ensure correct operation in that the product must pass in front of the detection system as it is pumped. The flow diverter 55 has been added in the flow path 53 of the pump to ensure that product is drawn through the sample chamber area 49. The flow diverter 55 does not intervene with the existing pump inlet opening size. A side view of the flow diverter is shown in FIG. 15. The flow diverter 55 provides several advantages, in that:
  it directs product flow, and in particular air bubbles, in front of the reflection sensor 65;
  it is sized in one axis to ensure that air bubbles will touch the inner wall 63 of the prism facets 71;
  it does not interfere with the sensor field of view because it allows light to be conducted directly through clear plastic of the flow diverter 55 through to the transmission sensor 69 thus reducing the signal to noise ration of the system; and/or
  it is designed in shape and positioning to achieve the above and to provide a 'washing' action against the inside of the prism facet, by guiding the fluid in contact therewith.

The doser 31, as stated above, forms part of an exchangeable supply pack embodied as a bag-in-box consumable. The pack is placed into the coffee machine/dispenser where the optical detection system is located. The doser 31 is shown in FIG. 16 engaged with an interface part 73 of a dispenser appliance. Thereby the doser 31 acts as a pack interface.

Locating handles and other mechanisms are not shown to simplify FIG. 16. The optical components are located in the dispenser interface part 73 housing a cavity 74 around the sample chamber 49 with its prism facets 71. Looking at the right hand FIG. 16B the light source 57 is located to the right of the prism facets 71, as will be understood in conjunction with FIGS. 12 and 14. The reflection sensor 65 is located directly above the prism facets 71 (as illustrated in FIG. 16B), while the transmission sensor 69 is located to the left of the prism facets 71.

A further function of the optical system is to confirm that the exchangeable supply pack has been properly loaded into the dispenser appliance. In this regard a separate Pack-in-Place (PIP) sensor 75 is located below the transmission sensor 69 at the left of the prism facets 71, as shown in FIG. 12.

The dispenser appliance thus include, the detection system as shown in FIG. 12 and contains a number of advantageous features as will be described below. The transmission light source 57 for the detection system may be a light emitting diode (LED). To provide maximum penetration of the product an infrared LED (wavelength ~880 nm) is preferred. The system will however also work at other wavelengths and has also been successfully tested at 650 nm. Generally a light emitting diode (LED) with a wavelength in a range of 500 nm to 950 nm, preferably within a range of 650 nm to 880 nm is suitable.

The preferred wavelength is a function of the product's spectral absorbance characteristics. For the more commonly used transmission only type systems (shining through product) the wavelength will be tuned so that the maximum attenuation is achieved when the product is present. As noted earlier the build up of product on the side walls can make this approach problematic.

For the proposed detection system the wavelength is chosen so that maximum transmission can be achieved. This allows light entering the sample chamber 49 to penetrate any film present that might be obscuring an air void behind. A further advantage of an infrared light source is that it is not readily detected by a consumer during pack replacement.

A second aspect of the transmission LED is its output beam angle. Illuminating the side wall of the sample chamber 49 with a wide angle light source will result in light propagating into and around the clear plastic side walls of the dosing assembly 31, This light can exit the side walls at various parts of the doser in an uncontrolled way and may make its way into the sensors in a rather uncontrolled manner. The result is that the sensors see some form of signal when in fact none should be present (reduced signal to noise ratio). To address this issue the output angle of the LED should be as narrow as possible and preferably around +/3 degrees (total half power beam width 6 degrees). Increasing the output angle is likely to result in reduced performance due to uncontrolled scattering of light.

When air is present against the inner wall 63 of the prism facets 71 internal reflection will occur resulting in light from the LED light source 57 turning 90 degrees towards the reflection sensor 65. Where a film of product is present between the air and side wall reflection will occur at the film/air boundary. Although some attenuation and scattering will occur at this film/air interface performance of the system is still sufficient to provide a reliable indication that air bubbles are passing through the system. The spacing between the inner wall 63 and the diverter 55 is critical to ensure that the air bubble places sufficient force against the side wall to ensure that the film of product is optically thin.

Figure 14:
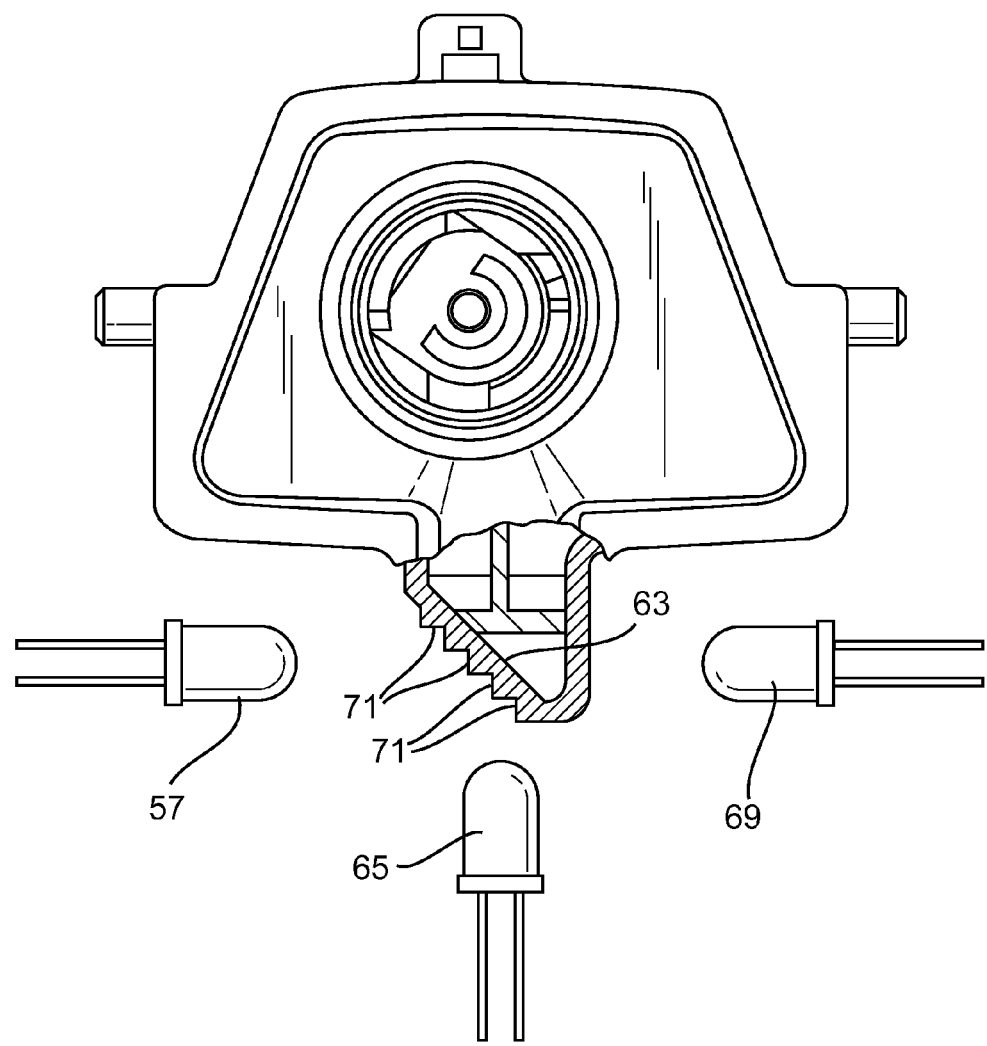
FIG. 14 is a general arrangement for the optical system of FIG. 12, as seen from above.

FIG. 14 is a detailed view of the optical system. The reflection sensor 65 is chosen to match the wavelength of the LED light source 57. The detection angle should be reasonably wide to allow integration of the signal coming from the prism internal surface 63. The reception angle should however not be so broad as to allow collection of stray light from other parts of the doser 31. An acceptance angle of 16 to 24 degrees (corresponding to: +/−8 to +/−12 degrees half power) is recommended.

For optimum system performance the LED light source 57, reflection and transmission sensors 65, 69 should be aligned on the same horizontal plane. The reflection sensor should be located at 90 degrees to the LED axis (FIG. 12). The exact location of the sensor in the horizontal plane should be optimized.

The transmission sensor 69 collects any light that passes through the sample chamber 49 when fluid product is present. The parameters for the transmission sensor 69 are similar to those of the reflection sensor 65 as regards wavelength and acceptance angle. Again for optimum performance the transmission sensor 69 should be located on the same axis as the LED light source 57.

Simultaneous detection of both a reflection and transmission allows a more detailed assessment of the product to be made. For example relatively transparent products such as a thin liquid espresso will predominantly be detected by the transmission sensor 69. Products such as milk, with high opacity and scattering properties, will also show some signal on the reflection sensor 65. These variations in characteristics (in either the dynamic or static state) may make it possible to discern the product contained in the exchangeable supply pack. This in turn may allow the consumer to place the pack in any position in a multiple pack dispenser, that accepts a plurality of exchangeable supply packs. The dispenser can then ascertain the product type from the optical signals presented.

With no doser 31 present in the dispenser appliance, i.e. in its interface part 73, the transmission sensor 69 will detect the output of the LED light source 57 directly while the reflection sensor 65 will receive no signal at all. This sensor reading can be used by auto calibration software to look at changes in the maximum signal level, where a change may represent possible contamination of the system.

The presence of an empty doser 31 will result in the reflection sensor 65 receiving a maximum signal level and the transmission sensor 69 a minimum signal. Again an auto calibration can be carried out at this point. This condition can also be used to initiate a pump priming sequence.

Where a used pack is placed in the machine both or either of the reflection and transmission sensors 65, 69 will receive a reduced signal level. In this case a pump priming sequence need not be initiated.

Dynamic measurement is another feature of the detection system cooperating with the doser 31. Known fluid product availability sensor systems use a static system of measurement. An example is a float sensor in a fluid tank. In such systems the sensor allows the pump to operate so long as there is sufficient fluid available to keep the float switch closed. The nature of the fluid product used in the exchangeable supply pack related to the invention precludes a simple static detection system. Between dosing cycles (which may be days) a thick film of product can build up on the side walls of the sample chamber 49. This thick build up can obscure the transmission detector 69 resulting in a false indication of product availability.

The dynamic system developed using the prism 59 (i.e. prism facets 71) and flow diverter 55 relies primarily on the detection of air bubbles entrained in the product. These bubbles passing through the sensor system sweep up against the inner wall 63 of the prism facets 71 result in short pulses of light refracting towards the reflection sensor 65. These pulses are readily detected during a pumping cycle.

A dynamic measurement algorithm examines the sensor system during the pump cycle and estimates the percentage of the pump cycle that contains air. An adjustable threshold determines when an unacceptable amount of air is passing through the system. At this point the product is flagged as no longer being available (end of pack).

Figure 17:
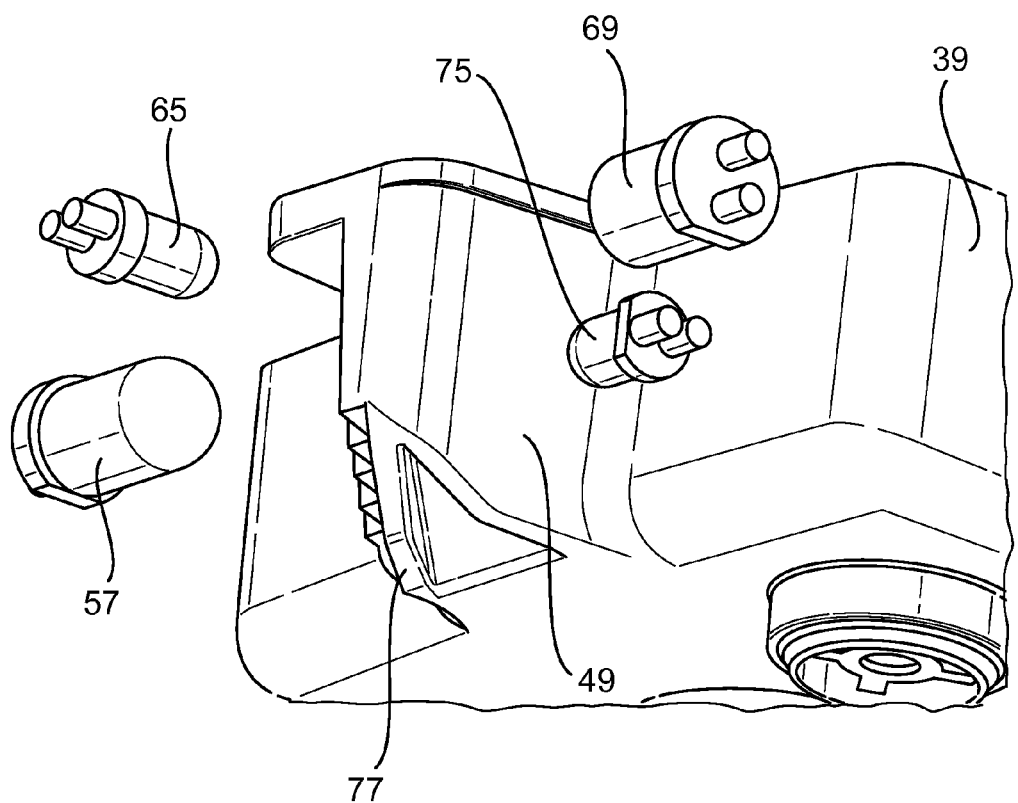
FIG. 17 is a partial perspective detail view showing detection tab for pack approaching detection.

An additional feature of the doser 31 is a second substantially opaque element 77 for wiggle and PIP sensing (FIG. 17). As the pack is placed into the dispenser a splined drive shaft 79 of the dispenser pump drive must engage with pinion 45 of the pump mechanism of the doser 31 (FIG. 18). A problem can be defined in that a driven member, such as the pinion 45 of the gear pump, has to be pressed into engagement with the splined shaft 79 that will be driving the pinion 45. Both driving shaft 79 and pinion 45 have a moderate amount of friction. When the splines 81 of the splined shaft 79 are not in line with mating formations 83 on the pinion 45 a solution is needed to align both without damaging the splines 81 or mating formations 83 of either part. This engagement is made easier if the drive shaft 79 is oscillating backwards and forwards by around +/−40 degrees, in accordance with arrows 85, 87 indicated in FIG. 18. According to a proposed solution the PIP sensor 75 detects when the pinion 45 is getting close to the drive shaft 79 and when this is the case, the drive shaft 79 is wiggled slightly for a few degrees. This lasts a second after the PIP sensor 75 detects the presence of the pinion 45 by means of the second substantially opaque element, in this Figure detection tab 77 (FIG. 17). The chosen solution for simplifying the engagement between driving and driven members 79, 45 is effective without human attention. FIG. 17 shows the detection tab 77 for drive shaft approach and 'wiggle' initiation. To aid early detection of the doser 31 approaching the splined drive shaft 79 of the appliance, the detection tab 77 is positioned at the bottom of the sample chamber 49. The tab 77 is sized and located to ensure that the light from the LED light source 57 to the transmission sensor 69 is obscured during lowering before the splined drive shaft 79 engages the pinion 45 of the doser 31. The tab 77 is used by the PIP sensor 75 for detecting pack approaching. As the pack is placed into the dispenser appliance the drive splines 81 of the dispenser drive shaft 79 must engage with the pump pinion 45 of the doser 31. This engagement is more readily achieved if the drive shaft 79 is rotated back and forth by a few degrees as the doser 31 engages the relevant splines 81. This oscillating rotation is referred to above as 'wiggling'.

A further aspect of the LED light source 57 and transmission sensor 69 is that they should be located to allow them to detect the bottom of the doser sample chamber 49 before the splined shaft 79 engages the pump mechanism. This detection initiates the wiggling action. The tab 77 is opaque or treated to be opaque and is added to the bottom of the sample chamber 49 to ensure that the transmission sensor 69 detects the housing at the correct point in the lowering cycle.

The engagement between the splined shaft 79 and the doser housing 39 is shown in FIGS. 18 and 19. The shaft 79 meets the doser bottom surface when the doser 31 is a first distance of (in this example) 8.8 mm above its home position. The splines 81 on the shaft 79 only engage with the pinion 45 at a second distance representing the last (in this example) 3.9 mm of a lowering cycle. The wiggling needs to start between the first and the second distance. The engagement sequence is described in more detail below.

FIG. 18 illustrates the spline engagement of the pump pinion 45 of the doser 31. while the subsequent pack-in-place detection is shown in FIG. 19. As a final check on system readiness the further PIP sensor 75 is placed below the transmission sensor 69. This sensor is activated when the doser 31 is in the fully loaded home position. The PIP sensor 75 is located so that sufficient light from the LED light source 57 will be detected when the pack is not in place. When properly located the tab 77 on the bottom of the sample chamber 49 will obscure the PIP sensor 75 thus providing an indication that the pack is fully loaded and can be operated (see also FIG. 17).

As noted above the transmission sensor 69 and LED light source 57 should be on the same axis. To allow sufficient light to reach the PIP sensor 75, and to ensure that it is activated in the correct position, it may be necessary to move the transmission sensor 69 slightly off axis. In this case great care should be taken to ensure that performance of the product-availability-detection (PAD) system is not compromised. Optical ray tracing followed by testing is recommended to ensure that the system retains the desired PAD performance.

The lowering sequence of the package with its doser 31 that is used to trigger the wiggling action and to indicate that the pack is in place is shown in FIGS. 17-19. At a third distance of (in this example) 10 mm above the home position light to the transmission sensor 69 is already being blocked by the tab 77 on sample chamber 49. As noted earlier, the shaft 79 is yet to meet with the housing 39 at this point.

Figure 19A:
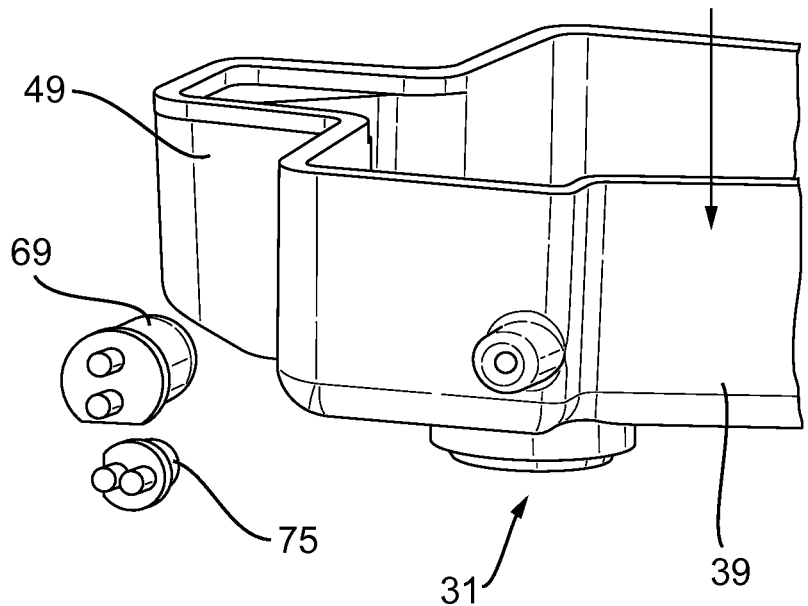
FIG. 19 schematically shows the doser lowering into position at larger (A) and smaller (B) distances of approaching.
Figure 19B:
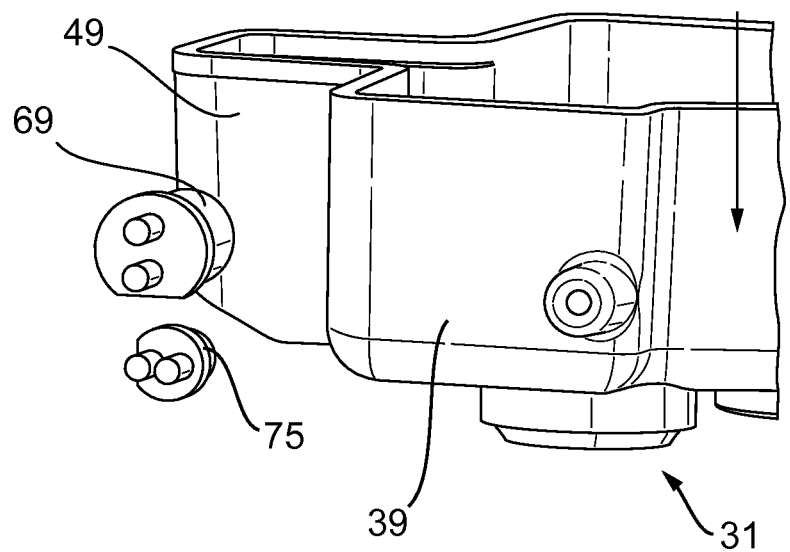

In FIG. 19 the doser 31 is shown lowering into position at the third distance of 10 mm (FIG. 19A) and at a fourth distance of (in this example) 5 mm (FIG. 19B). By about 5 mm the transmission sensor 69 is fully obscured, but still well ahead of the second distance of 3.8 mm of the drive shaft's engagement with the gear pinion 45. The PIP sensor 75 is now also starting to become obscured at this point. At a fifth distance of (in this example) 2.5 mm the PIP sensor 75 has become fully obscured. The loading handle (not shown but conventional) can conveniently have a spring loaded 'over-centre' operation and so will assist to drive the doser 31 into its fully lowered home position.

While in the examples described herein the various detectors have been represented as sensors, it is within the understanding of the skilled person that such detectors could be assemblies inclusive of lenses, light guides, optical and/or electronic filters etc. As will also be clear to the skilled person, automated detection is unrelated to the specific gear pump for dosing fluid and other forms of dosing may be combined with the detection system of the invention.

Accordingly means have been described that are provided for the support of the automated process of supplying beverages. More particularly, the detection of the presence and the contents of exchangeable supply packs (9) in beverage dispensing machines is thereby automated. A pack-in-place detection is provided by emitting light and measuring the presence of the emitted light on a one light detector (7, 75), the system determines the absence or the correct/incorrect placement of the supply pack. A product availability detection is provided by detecting the intensity of light coming through a transparent element in the supply pack by a another light detector (5; 65, 69), the system identifies the degree of product presence in the supply pack.

It is believed that the operation and construction of the present invention will be apparent from the foregoing description and drawings appended thereto. It will be clear to the skilled person that the invention is not limited to any embodiment herein described and that modifications are possible which should be considered within the scope of the appended claims. Also kinematic inversions are considered inherently disclosed and to be within the scope of the invention. In the claims, any reference signs shall not be construed as limiting the claim. The term 'comprising' and 'including' when used in this description or the appended claims should not be construed in an exclusive or exhaustive sense but rather in an inclusive sense. Thus the expression 'comprising' as used herein does not exclude the presence of other elements or steps in addition to those listed in any claim. Furthermore, the words 'a' and 'an' shall not be construed as limited to 'only one', but instead are used to mean 'at least one', and do not exclude a plurality. Features that are not specifically or explicitly described or claimed may be additionally included in the structure of the invention within its scope. Expressions such as: "means for . . . " should be read as: "component configured for . . . " or "member constructed to . . . " and should be construed to include equivalents for the structures disclosed. The use of expressions like: "critical", "preferred", "especially preferred" etc. is not intended to limit the invention. Additions, deletions, and modifications within the purview of the skilled person may generally be made without departing from the spirit and scope of the invention, as is determined by the claims.

The invention claimed is:

1. A system comprising a beverage dispensing machine and at least one exchangeable supply pack comprising a doser and a product to be supplied in the operation of the system, said system comprising one or more detection means for at least automatically detection of the presence of the exchangeable supply pack and of the product in the exchangeable supply pack said means comprising:
   a first interface for incorporation in a machine;
   a second interface on the doser of the exchangeable supply pack, operatively connectable to the first interface;
   a transmitter on the first interface for emitting radiation;
   a first detector on the first interface for detecting presence of product in the exchangeable supply pack;
   a second detector on the first interface for detecting presence of the exchangeable supply pack; and
   wherein the second interface is receivable between the transmitter and both the first and second detectors, to interfere with radiation emitted by the transmitter, the second interface comprising
   a first transparent element which in use is positioned between the transmitter and the first detector; and
   a second opaque element which in use is positioned between the transmitter and the second detector.

2. The system according to claim 1, wherein the transmitter is an infrared (IR) light transmitter.

3. The system according to claim 1, wherein the transmitter is a light emitting diode (LED).

4. The system according to claim 1, wherein the doser has an upper part that is substantially transparent and adapted to be filled with the product to be supplied and a lower part that is substantially opaque.

5. The system according to claim 1, further being arranged to verify whether a signal generated by the first detector is below or above a predefined threshold.

6. The system according to claim 5, wherein when the first detector detects radiation above the predefined threshold in combination with the second detector generating substantially no signal, a period of time lapsed after activation is considered to determine whether a positioned pack is empty or full, but still unopened.

7. The system according to any one of claim 1, wherein a complete lack of signal from at least one of the first and second detectors is interpreted as a failure condition.

8. The system according to claim 1, wherein the first interface is a machine interface, and the second interface is a pack interface.

9. The system according to claim 1, wherein the first transparent element includes an optical element.

10. The system of claim 9, wherein the optical element is a prism.

11. The system of claim 10, wherein the prism includes a plurality of prism facets.

12. The system according to claim 1, wherein the machine interface further includes a third detector.

13. The system of claim 12, wherein the third detector is directed perpendicular to the common axis, and the optical element is adapted to be aligned with both the first detector and the third detector.

14. The system of claim 12, wherein the third detector is a reflection sensor.

15. The system of claim 14, wherein the third detector is a reflection sensor and has a reception angle in a range of 16 to 24 degrees.

16. The system according to claim 1, wherein the first detector is substantially aligned with the transmitter on a common axis.

17. The system according to claim 1, wherein the first transparent element is a sample chamber and a flow diverter is arranged within the sample chamber whereby the flow diverter is of a transparent material, so as not to block incident light emitted from the transmitter.

18. The system according to claim 1, wherein the second opaque element is an opaque tab extending from a bottom of the sample chamber, positioned and located to ensure that during placing of an exchangeable supply pack, radiation of the transmitter is first obscured by the opaque tab, before the transparent sample chamber becomes aligned with the common axis.

19. The system of claim 18, wherein the doser includes a pump having a driven pump pinion, wherein the machine interface has a drive shaft for driving the pump pinion, and wherein detection of the tab initiates back and forth rotating movement of the drive shaft, to assist in engagement of the pump pinion with the drive shaft.

20. The system according to claim 1, wherein the doser includes a pump having a driven pump pinion, and wherein the machine interface has a drive shaft for driving the pump pinion.

21. The system according to claim 1, wherein in use with an exchangeable supply pack properly connected to the beverage dispensing machine, presence of product in the exchangeable supply pack is detected dynamically during a dosing cycle of to product from the supply pack to the beverage dispensing machine.

22. The system of claim 21, wherein a dynamic measurement algorithm is arranged to estimate an amount of air bubbles in the fluid product during a dosing cycle and to decide, based on that estimate, whether the supply pack has reached an end of its contents.

23. The system according to claim 1, wherein the transmitter is a light emitting diode (LED) with a wavelength in a range of 500 nm to 950 nm, preferably 650 nm to 880 nm.

24. The system of claim 23, wherein the transmitter has an output angle of about 3 degrees.

25. The system according to claim 1, wherein the first detector has a reception angle in a range of 16 to 24 degrees.

* * * * *